(No Model.) 3 Sheets—Sheet 1.
F. HEMELRIGHT & J. W. TAYLOR.
ROTARY CUT-OFF VALVE.
No. 551,961. Patented Dec. 24, 1895.
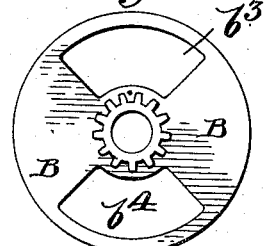
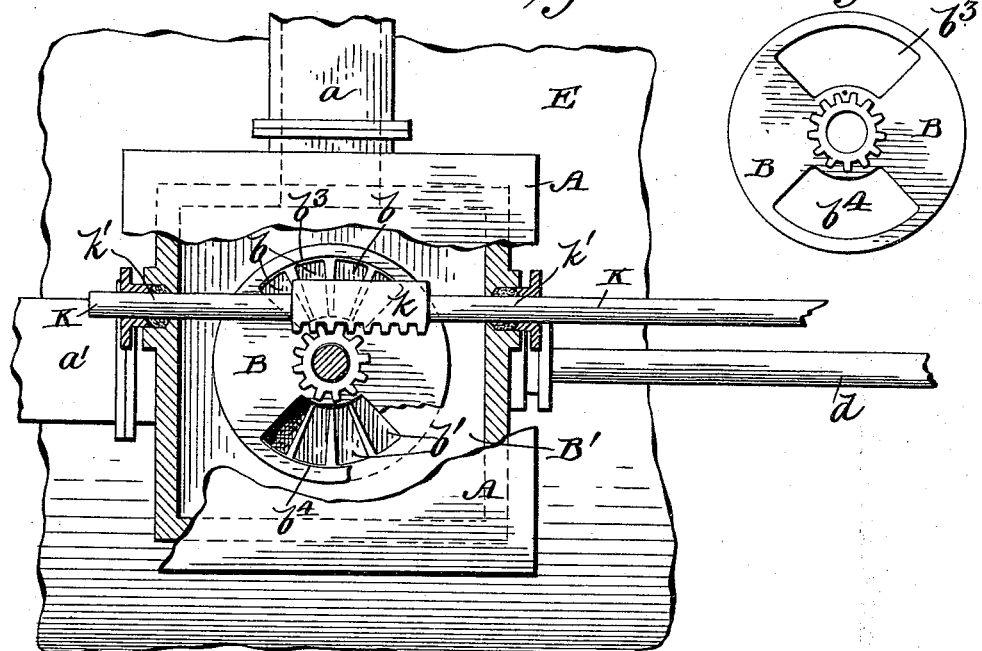
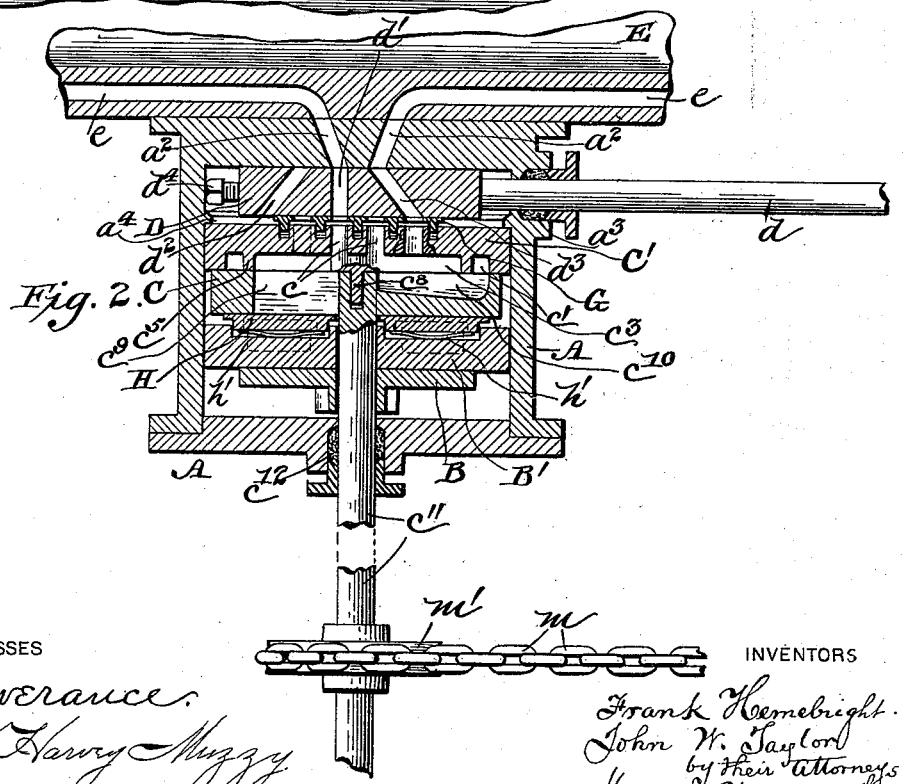
WITNESSES
INVENTORS (No Model.) 3 Sheets—Sheet 2.
F. HEMELRIGHT & J. W. TAYLOR.
ROTARY CUT-OFF VALVE.
No. 551,961. Patented Dec. 24, 1895.
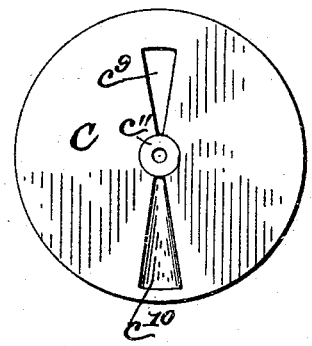
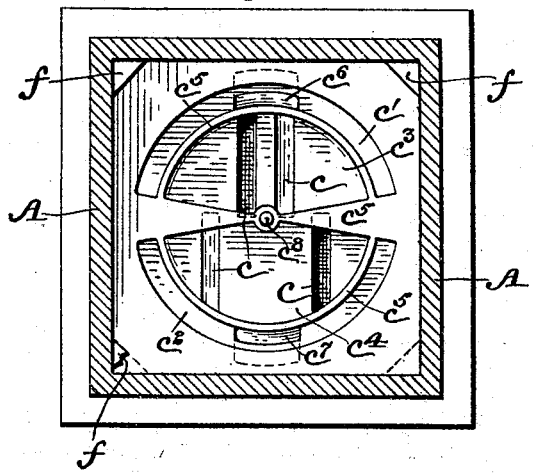
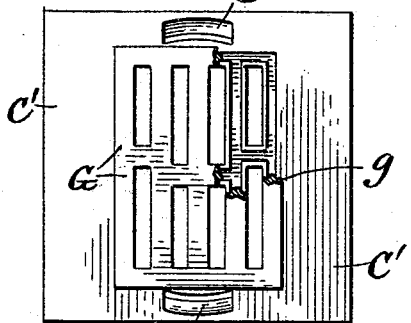
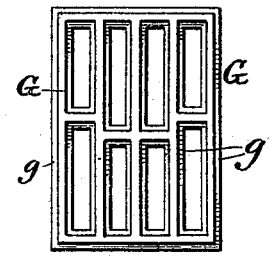
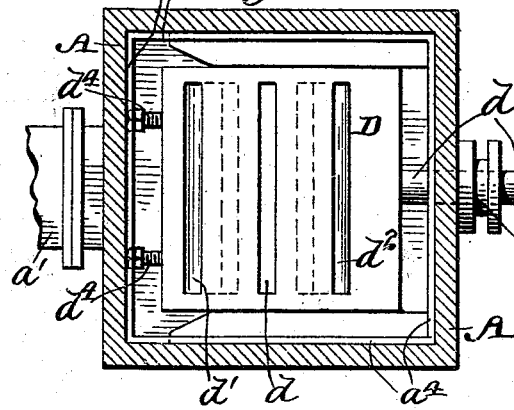
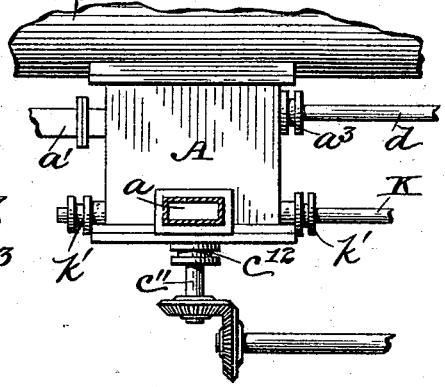

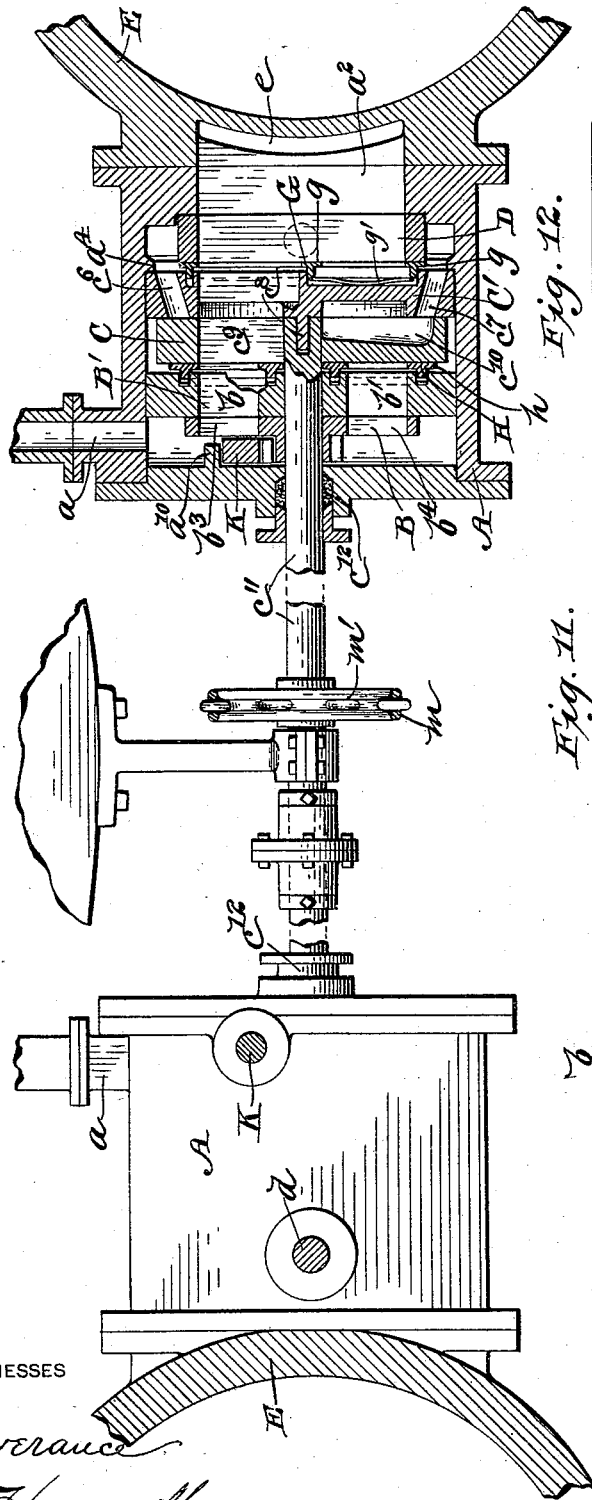
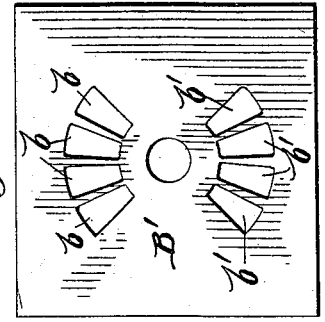
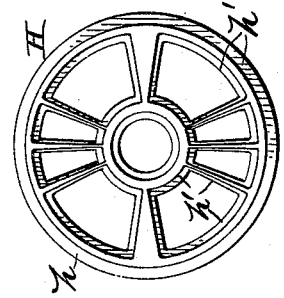
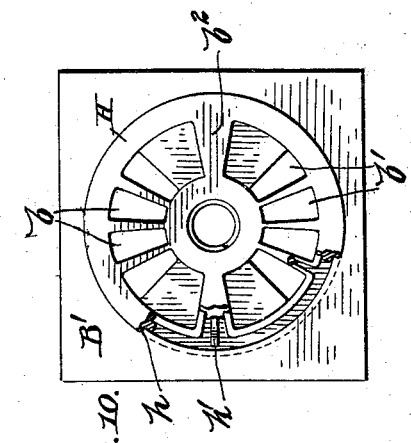

UNITED STATES PATENT OFFICE.

FRANK HEMELRIGHT AND JOHN WATKINS TAYLOR, OF JERMYN, PENNSYLVANIA.

ROTARY CUT-OFF VALVE.

SPECIFICATION forming part of Letters Patent No. 551,961, dated December 24, 1895.

Application filed September 18, 1895. Serial No. 562,860. (No model.)

*To all whom it may concern:*

Be it known that we, FRANK HEMELRIGHT and JOHN WATKINS TAYLOR, citizens of the United States, residing at Jermyn, in the county of Lackawanna and State of Pennsylvania, have invented certain new and useful Improvements in Rotary Cut-Off Valves; and we do hereby declare the following to be a full, clear, and exact description of the invention, such as will enable others skilled in the art to which it appertains to make and use the same.

Our invention relates to improvements in steam-engine valves, and has more particular relation to valves of the rotary class.

It consists of the combination, with a valve-casing, of a sliding reversing-valve, a main-valve seat having passages communicating with the same and provided with exhaust-passages, a main rotary valve mounted against said seat, and a cut-off valve in communication with said rotary valve.

It also consists of the combination, with a valve-casing, of a main-valve seat having inlet and exhaust passages, a main rotary valve mounted against said seat and provided with an inlet-passage and an exhaust-recess, a cut-off valve and seat comprising a plate having inlet-passages with which the inlet of the main valve communicates successively and a rotary cut-off for covering any desired number of the said inlet-passages equally on diametrically opposite sides of the said cut-off valve.

It also consists of certain other novel constructions, combinations, and arrangements of parts, all of which will be hereinafter more particularly set forth and claimed.

In the accompanying drawings, forming part of this specification, Figure 1 represents a top plan view of a valve embodying our invention, the valve-casing being broken away. Fig. 2 represents a horizontal section through said valve. Fig. 3 represents a detail side elevation of the main valve. Fig. 4 represents a side elevation of the main-valve seat, the casing being shown in section. Fig. 5 represents a side elevation of the same taken on the opposite side from that shown in Fig. 4. Fig. 6 represents a side elevation of the packing-frame of said main-valve seat. Fig. 7 represents a side elevation of the reversing-valve, the valve-casing being broken away. Fig. 8 represents a top plan view of our said valve and a portion of a cylinder to which it is attached. Fig. 9 represents a view of two valves as arranged on opposite sides of a locomotive and coupled together, one being shown in side elevation and the other in central vertical section. Fig. 10 represents a side elevation of the seat of the cut-off valve. Fig. 11 represents a side elevation of the packing-frame of the said cut-off-valve seat, and Fig. 12 represents a side elevation of the said cut-off-valve seat taken on the opposite side from that shown in Fig. 10. Fig. 13 is a detail view of the cut-off valve.

A in the drawings represents the valve-casing; B, the cut-off valve; B', its seat; C, the main valve; C', its seat, and D the reversing-valve. The casing A is provided with a live-steam inlet $a$, an exhaust $a'$ and outlets $a^2$. The latter are in the shape of vertical slots that communicate respectively with the passages $e\ e$, that in turn communicate with the respective ends of the cylinder E.

The reversing-valve D is mounted in the casing so as to reciprocate over said outlets $a^2$ and is actuated by a stem $d$ which passes through a packing $a^3$ in the wall of the valve-casing. This stem is connected to an operating-lever, whereby it is operated. The said valve D is provided with passages $d'\ d^2\ d^3$, the central one $d'$ being a straight passage and the two outer passages $d^2$ and $d^3$ on opposite sides of the same being inclined in opposite directions. Adjusting-bolts $d^4$ are provided in the end of said reversing-valve, whereby it may be adjusted so that the passages $d'$ and $d^3$ exactly coincide with the passages $a^2$ when the valve is moved in.

The main-valve seat C' is mounted against a ledge $a^4$ formed on the interior of the casing A and is provided with four steam-passages $c\ c\ c\ c$, that are adapted to communicate in pairs and alternately with the passages $d'\ d^2\ d^3$ of the valve D when the latter is operated to reverse the engine. The face of the valve-seat on the side opposite from the reversing-valve is formed with approximately semiannular channels $c'$ and $c^2$ and approximately semicircular recesses $c^3$ and $c^4$ within the same. Both the channels and the recesses are independent of each other, being divided by a partition $c^5$. Two of the passages $c\ c$ communicate with one of the recesses $c^3$ and two with the other recess $c^4$, the arrangement being such that the inlet to the cylinder will be on one side of the partition $c^5$ through either one of the recesses $c^3$ or $c^4$ and the outlet through the opposite recess. Each of the channels $c'$ and $c^2$ opens respectively into independent exhaust-passages $c^6$ and $c^7$, and said passages both discharge into one end of the casing and thence through the exhaust-passage in the wall of the said casing. The side of this valve next the reversing-valve is recessed to accommodate the spring-pressed packing-frame G. This frame surrounds all of the passages $c\ c\ c\ c$, and the bars forming the same are provided with overlapping flanges $g$, so that the operating-surface of said frame will have a smooth firm bearing upon the reversing-valve. Bow-springs $g'$ are provided beneath the said frame to force it outward and into firm contact with the reversing-valve and thus form a steam-tight joint. A stud $c^8$ is provided at the middle of the partition $c^5$, and on this stud is mounted the rotary valve C. This valve is provided with an inlet-passage $c^9$ and an exhaust-recess $c^{10}$, said passage and recess being arranged diametrically opposite each other, so that as the live steam is being fed to one of the recesses $c^3$ or $c^4$ the expanded steam is being discharged from the opposite recess into one of the exhaust-channels $c'$ or $c^2$. The recess $c^{10}$ is of sufficient length to extend from one of the recesses $c^3$ or $c^4$ over the dividing-wall and one of the channels $c'$ or $c^2$ and thus provide means of communication between said recesses and channels.

The valve C is provided with a stem $c''$, which extends outward through a packing $c^{12}$ in the casing. Next to the valve and surrounding the valve-stem is the cut-off-valve seat B'. This seat is supported against corner-posts $ff$ and is provided with two series of passages $b\ b\ b\ b$ and $b'\ b'\ b'\ b'$, arranged on diametrically-opposite sides of the valve-stem opening, whereby wide blank spaces having no openings are left between each series. On the side of this seat next to the main valve each end passage $b$ and $b'$ of the two series is enlarged, so as to leave only a dividing-partition $b^2$ that corresponds in shape and position with the partition on the main-valve seat. This cut-off-valve seat is provided like the main-valve seat with a packing-frame H set in recesses formed in the solid portions surrounding the several openings in said seat. This frame is provided also with overhanging flanges $h$ for the same purpose as those of the packing of the main valve. Bow-springs $h'$ are mounted behind the packing-frame, so as to force it forward against the main valve and thus form a steam-tight joint. Instead of springs we may introduce steam back of the packing-frames of both valves and thus force them forward.

The cut-off valve B oscillates against the seat B' over the openings $b\ b\ b\ b$ and $b'\ b'\ b'\ b'$, and is provided with openings $b^3$ and $b^4$ situated diametrically opposite each other. This valve surrounds the main-valve stem and is provided with a toothed wheel which is rigid thereon. This wheel is engaged and operated by a rack $k$ mounted on a stem K, which in turn is mounted in packings $k'\ k'$ in opposite walls of the casing. This stem K is either connected to a shifting-lever or to the governor of the engine, as the case may be, and the cut-off valve is thus operated to cover one or more of the series of passages in the cut-off-valve seat, the construction being such that the two series of passages in said cut-off-valve seat are opened or closed equally. The steam-inlet L is formed in the casing just above the cut-off valve and in front of the same and thus supplies steam to the passages of the said cut-off.

As shown in Fig. 8 the main-valve stem is rotated by gearing connected to the moving parts of the engine.

In Fig. 9 we have shown two valves on opposite sides of a locomotive with their main-valve stems coupled together and operated by a chain $m$, which passes over a wheel $m'$ on one of said stems and a similar wheel on the shaft of the engine.

With our cut-off valve we can cut off the steam at any portion of the stroke desired and have the pressure either from center to center of the stroke or any intermediate points. The removable side $a^5$ of the valve-casing is provided with a flange $a^{10}$, which assists in guiding the rack $k$.

The steam first passes through the uncovered passages in the cut-off valve, then through the steam-port in the main valve into either one or the other of the semicircular recesses in the main-valve seat, then through one of the passages communicating with said recess, through the reversing-valve and into the cylinder, the steam from the opposite end of the cylinder passing in the meantime back through the other passage in the reversing-valve, through the opposite recess in the valve-seat, through the discharge-recess in the main valve and out through one or the other of the exhaust-channels. The reverse-valve can rise slightly in its seat so as to allow the steam to escape into the exhaust portion of the steam-chest when such an action becomes necessary, as it sometimes does when the valve is moved over the cylinder-ports so that they are both closed.

Having now described our invention, what we claim as new, and desire to secure by Letters Patent, is—

1. In a steam engine valve, the combination with a valve casing, of a sliding reversing valve, a main valve seat having passages communicating with the same and provided with exhaust passages, a main rotary valve mounted against said seat and a cut off valve having passages which communicate with the main valve, substantially as described.

2. In a steam engine valve, the combination with a valve casing of a main valve seat having inlet and exhaust passages, a main rotary valve mounted against said seat and provided with an inlet passage and an exhaust recess, a cut off valve in communication with said main valve and comprising a plate having inlet passages with which the inlet of the valve communicates successively, and a rotary cut off for covering any desired number of said inlet passages equally on diametrically opposite sides of the said valve, substantially as described.

3. In a steam engine valve, the combination with a valve casing of a sliding reversing valve, a main valve seat mounted in proximity to the same and provided with inlet and exhaust passages, an expansible packing between said reversing valve and the main valve seat, a main rotary valve mounted against said seat, a cut off valve seat, an expansible packing between the same and the main valve, and a cut off valve, substantially as described.

4. In a steam engine valve, the combination with a valve casing, of a main valve seat having independent approximately semi-annular exhaust channels and independent approximately semi-circular steam recesses in communication with the respective ends of the cylinder and a rotary main valve mounted above said recesses and channels and having an inlet passage and an exhaust recess; the latter adapted to bring said recesses and channels into communication successively as the valve rotates, substantially as described.

5. In a steam engine valve, the combination with a valve casing, of a rotary main valve having an independent inlet passage and an exhaust recess, a cut off valve seat having two series of inlet passages arranged diametrically opposite each other and a rotary cut off valve having inlet passages arranged on diametrically opposite sides; the construction being such that the inlet passages on the opposite sides are cut off or opened equally when the valve is rotated, substantially as described.

6. In a steam engine valve, the combination with a main valve, a seat for the same having independent inlet recesses each provided with a pair of inlet passages, a reversing valve having a plurality of passages that are adapted to be brought respectively into communication with the respective passages of the valve seat and thus reverse the flow, of the steam, substantially as described.

7. In a steam engine valve, the combination with a main valve and seat, a reversing valve, a cut off valve comprising a seat having two series of passages arranged diametrically opposite each other, a cut off valve proper having inlet passages arranged diametrically opposite each other, a gear on said latter valve and a rack bar engaging said wheel for actuating said valve, substantially as described.

In testimony whereof we hereunto affix our signatures in presence of two witnesses.

FRANK HEMELRIGHT.
JOHN WATKINS TAYLOR.

Witnesses:
W. J. BAKER,
J. M. GRAVES.